Oct. 28, 1924.  1,513,076
F. VISINTAINER
SYSTEM FOR LOCATING BREAKS IN ELECTRIC POWER LINES
Filed Feb. 11, 1922
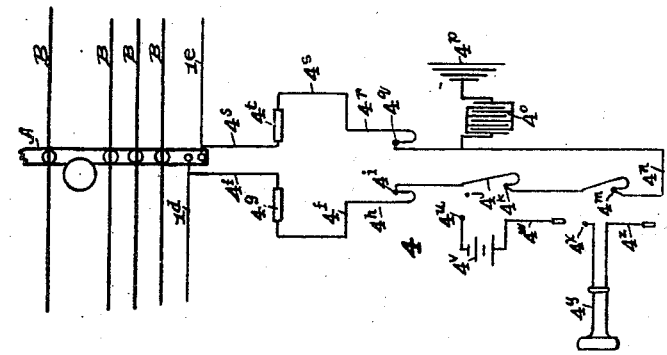
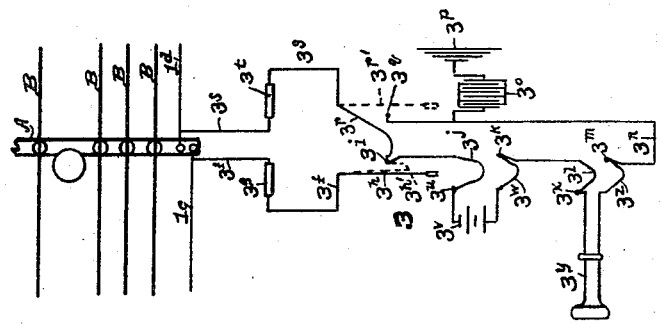
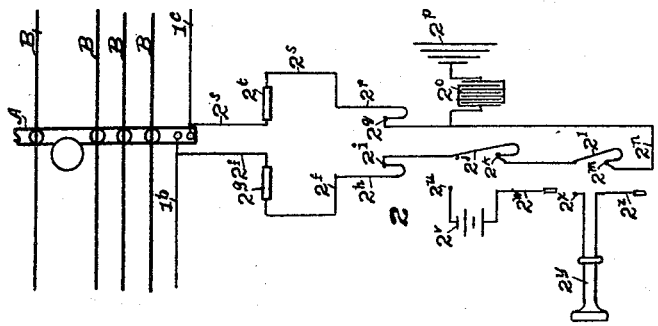
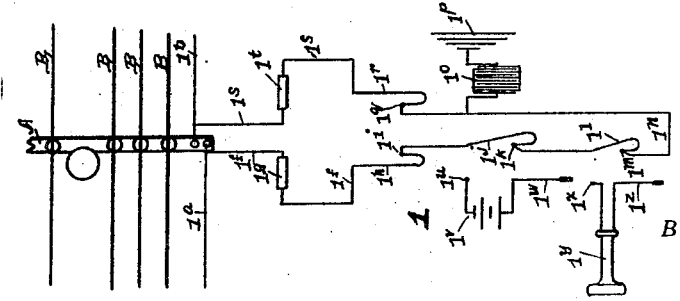
Felix Visintainer,
INVENTOR.
BY David E. Lain,
ATTORNEY.

Patented Oct. 28, 1924.

1,513,076

UNITED STATES PATENT OFFICE.

FELIX VISINTAINER, OF GLACIER, WASHINGTON.

SYSTEM FOR LOCATING BREAKS IN ELECTRIC-POWER LINES.

Application filed February 11, 1922. Serial No. 535,967.

*To all whom it may concern:*

Be it known that I, FELIX VISINTAINER, a citizen of the United States, and a resident of Glacier, in the township of Glacier, county of Whatcom, and State of Washington, have invented a new and useful System for Locating Breaks in Electric-Power Lines, of which the following is a specification.

My invention relates to improvements in systems for locating breaks in electric power lines, more especially these parts of those electric power lines which traverse rough, mountainous, timbered country sometimes covered by deep snow. Under these rigorous conditions the breaks which my system is designed to locate are caused by a tree falling across the electric line, or by an avalanche of snow. In both cases the break is usually sweeping and includes all of the conductors carried by the supporting structure and often one or more poles of said structure. It is therefore sufficient to confine the testing to a circuit reserved for this purpose but supported on the same structure with the power wires, and the object of my improvement is to provide means whereby breaks in electric power lines may be located by locating breaks in a testing circuit, strongly insulated from the power wires but supported on the same structure therewith, from conveniently placed stations.

One means of reducing my system to practice is illustrated in the accompanying sheet of drawings by which are shown a method of wiring a number of stations which are conveniently placed but which connect with more or less distant parts of a power line parts of which may be difficult to reach at certain seasons.

More particularily: Four cross arms of an electric power line are shown at A, A, A, A. Between each couple of adjacent cross arms may be great lengths of the power line, the four wire B, B, B, B of which are shown as broken away between said arms. Said wires are fastened to suitable insulators on said arms. The testing stations shown are numbered 1, 2, 3 and 4 respectively. Test wires $1^a$, $1^b$, $1^c$, $1^d$ and $1^e$ are fastened to insulators on arms A between testing stations. Test wire $1^a$ runs from a station to the left of station 1, not shown, to said station 1. Test wire $1^b$ runs from station 1 to station 2. Test wire $1^c$ runs from station 2 to station 3. Test wire $1^d$ runs from station 3 to station 4. And test wire $1^e$ runs from station 4 to a station to the right, not shown. The right-hand end of wire $1^a$ is connected to station 1 by wire $1^f$ through fuse plug $1^g$. Wire $1^f$ connects said fuse plug with switch cord $1^h$ which is provided with a plug shown as inserted in hole $1^i$, and it is also adapted for insertion in hole $1^q$. The casing of hole $1^i$ is by wire connected to switch cord $1^j$, the plug of which is shown as inserted in hole $1^k$ and which is also insertable in hole $1^u$. The casing of hole $1^k$ is connected by wire to switch cord $1^l$, which is shown as inserted in hole $1^m$, and which is also insertable in hole $1^x$. The casing of hole $1^m$ is connected by wire $1^n$ to the casing of hole $1^q$. The plug of switch cord $1^r$ is shown as inserted in hole $1^q$, and said cord is connected to wire $1^s$ which connects with the left-hand end of test wire $1^b$ on the line. Said wire $1^s$ is connected through fuse plug $1^t$. One terminal of a condenser $1^o$ is connected to said wire $1^n$ and the other terminal of said condenser is grounded at $1^p$. One terminal of a local battery $1^v$ is connected to the casing of said hole $1^u$, and the other terminal of said battery is connected to switch cord $1^w$ the plug of which is connectable with hole $1^k$. One terminal of a telephone receiver $1^y$ is connected to the casing of hole $1^x$ and the other terminal of said telephone receiver is connected to switch cord $1^z$ the plug of which is insertable in hole $1^m$.

The connections illustrated in station 1 and above described are duplicated in kind at each of the other testing stations and remain as shown at station 1 at all times except when a station is entered and used for the purpose of localizing a break in the test wires between said stations. For the purpose of easy reference to the several elements of the connections at each station each has a designating numeral the same as the number of said station with a letter exponent the same as the similar element in the other stations.

The connections shown in full lines at station 3 are those made when testing for a break in test wire $1^d$ to the right of said station. Here switch cord $3^h$ is disconnected from hole $3^i$ and the plug of switch cord $3^r$ is taken from hole $3^q$ and inserted in hole $3^i$. The plug of switch cord $3^j$ is taken from hole $3^k$ and inserted in hole $3^u$. The plug of switch cord $3^w$ is inserted in hole $3^k$. The plug of switch cord $3^l$ is removed from hole $3^m$ and inserted in hole $3^x$. The plug of switch cord $3^z$ is inserted in hole $3^m$. By following the course of the circuit in station 3 as described and illustrated in full lines it can be seen that electrical connections with test line $1^c$ are broken while one terminal of telephone receiver $3^y$ is grounded through condenser $3^o$, and the other terminal of said receiver is connected through battery $3^v$ to the left-hand end of test line $1^d$. Then by removing the plug of switch cord $3^l$ from hole $3^x$ while said telephone receiver $3^y$ is held to the ear, if test wire $1^d$ is broken, no sound will be caused by said telephone receiver by the removal of said plug. But if said test wire is unbroken, there is a circuit for battery $3^v$ through condenser $3^o$, by induction, to ground $3^p$ and through condenser $4^o$, by induction, to ground $4^p$; and the removal of said plug, as well as the replacement thereof, will cause the interruption in said circuit requisite to establish electrical communication through said condensers by induction and a noise will be emitted by said telephone receiver.

Testing for a break in test wire $1^c$ at station 3 is provided for by making the following changes, at the switch board in said station, in the connections as last above described: Remove the plug of switch cord $3^r$ from hole $3^l$ and allow said cord to assume its dotted-line position at $3^{r\prime}$, then insert the plug of switch cord $3^h$ in hole $3^l$, as shown in dotted line at $3^{h\prime}$. The electrical connections at station 3 are then such that connection between said station and test wire $1^d$ is broken and one terminal of telephone receiver $3^y$ remains grounded to induction through condenser $3^o$ at $3^p$ while the other terminal of said receiver is connected through battery $3^v$ to the right-hand end of test wire $1^c$. This places said telephone receiver in circuit for interrupted electric currents with said battery between grounds at $3^p$ and $2^p$ if test wire $1^c$ is unbroken. Therefore, if said test wire is unbroken a sound will be emitted from said telephone receiver when the plug of switch cord $3^l$ is removed from or replaced in hole $3^x$. But no sound will come from said receiver when said plug is caused to make and break electrical connections with the casing of said hole $3^x$ if said test wire $1^c$ is broken.

After said described tests are made at station 3 the connections illustrated in stations 1, 2 and 4 are duplicated in station 3, and this station also is in condition for normal operation of the power line. Also, in the same manner as described relative to station 3, tests for condition of test wires $1^b$ and $1^c$ can be made at station 2, tests for condition of wires $1^a$ and $1^b$ can be made at station 1, while tests for condition of wires $1^d$ and $1^e$ can be made at station 4. In a similar manner any one of a number of other similarly wired stations can be used to test the condition of the test wires to the right and to the left of said station.

The power lines for which my system of testing for breaks is more particularly applicable traverse mountainous, broken and timbered country where heavy falls of snow are likely to occur. Certain portions of these lines are accessible only with great difficulty at certain seasons. By the use of my system of testing stations a break in the test wires is easily located between two stations after the manner described. The causes of breaks in the test wires during the season of snows are usually falling timber or snow slides. These occurrences usually disrupt all of the power wires as well as the less strong test wires. It not infrequently occurs that the broken wires are not grounded at the place of the fault, making an open circuit test necessary, and this test my system is designed to make.

It is evident that since the wire connections at each of my testing stations form a loop connecting the ends of adjacent test wires, said test wires may be used for telephonic communication between the power house and the power station when all of said stations are as illustrated at stations 1, 2 and 4.

The telephone receiver indicated in the drawing is used as a current detector only. Any other sensitive current detector would serve equally well. Also the local station batteries can be replaced with a hand-operated magneto, or the like, carried into the stations by the line man. Because of the high voltage and great energy of the currents carried by power lines fuse plugs $1^g$, $1^t$; $2^g$, $2^t$; etc., etc., placed in the test wires where they enter and leave the stations are important in that they prevent the entry of current from the power wires, due to chance contact with the test wire, sufficient to burn out the station equipment.

Having thus disclosed my invention, what I claim is new and desire to secure by Letters Patent is,—

1. In combination, the supporting structure of an electric power line, a test wire on insulators on said structure separate from the insulators for the power wires, a plurality of normally closed loops in said test wire each leading to one of a plurality of testing stations located at points distant from said power line, and means at each of said stations adapted to open said loop thereat and include in said test wire circuit a battery and an electric current detector.

2. In combination, the supporting structure of an electric power line, a test wire on insulators on said structure separate from the insulators for the power wires, a plurality of normally closed loops in said test wire each leading to one of a plurality of testing stations located at distant points, a condenser one terminal of which is connected to the ground and the other terminal of which is connected to said loop in each of said stations, and means at each of said stations adapted to open said loop thereat and include in said loop a battery and an electric current detector.

3. In combination, a test wire mounted on insulators on the supporting structure of an electric power line apart and independent from the insulators mounting the wires of said electric power line, a plurality of test stations at distances from said power line into each of which said test wire enters, a local source of electricity in each of said stations, and means adapted to introduce into said test wire at each of said test stations as desired electrical energy from said local source of electricity independent of the effect of any other electric energy, normal or abnormal, which pervades said test wire, whereby tests for circuit between said stations may be made at any one of said stations.

4. In combination, a line of electric conduits adapted for power transmission, a line of electric conduits adapted for circuit testing disposed along side of said power line on the same supporting structure therewith but separated therefrom by powerful electrical resistance and having a plurality of lateral loops therein extending to points distant from said power line, and electrogenerative, circuit-testing means electrically and physically separate from said power conduits adapted for inclusion in the circuit of each of said loops as desired whereby the place of disruption in said testing circuits is located between two of said loops.

5. In combination, a plurality of sections of a test wire fastened to insulated supports on an electric power line, a plurality of testing stations into each of which the adjacent ends two of said sections of said test wire enter, a grounded electric condenser in each of said stations, an electric current detector in each of said stations, an electric battery in each of said stations, means to in turn connect the adjacent ends of said testing wires in said station to the ungrounded terminal of said condenser, means to in turn cut said battery into circuit between each of said adjacent ends of said testing wires and said condenser, means to cut said current detector into circuit between said battery and said condenser, and means to open and close the connection between said current detector and said battery.

FELIX VISINTAINER.